US008743080B2

(12) United States Patent
Hargreaves et al.

(10) Patent No.: US 8,743,080 B2
(45) Date of Patent: Jun. 3, 2014

(54) SYSTEM AND METHOD FOR SIGNALING IN SENSOR DEVICES

(75) Inventors: Kirk Hargreaves, Sunnyvale, CA (US); Adam Schwartz, Redwood City, CA (US); Joseph Kurth Reynolds, Alviso, CA (US); Clyde Washburn, Victor, NY (US)

(73) Assignee: Synaptics Incorporated, San Jose, CA (US)

( * ) Notice: Subject to any disclaimer, the term of this patent is extended or adjusted under 35 U.S.C. 154(b) by 513 days.

(21) Appl. No.: 13/170,035

(22) Filed: Jun. 27, 2011

(65) Prior Publication Data

US 2012/0326910 A1 Dec. 27, 2012

(51) Int. Cl.
*G06F 3/045* (2006.01)

(52) U.S. Cl.
USPC .......................................................... 345/174

(58) Field of Classification Search
CPC ................................. G06F 3/044; G06F 3/047
USPC ..................... 345/173, 174; 178/18.03, 18.06
See application file for complete search history.

(56) References Cited

U.S. PATENT DOCUMENTS

| | | | |
|---|---|---|---|
| 4,170,025 | A | 10/1979 | Benkley et al. |
| 4,459,541 | A | 7/1984 | Fielden et al. |
| 4,733,222 | A | 3/1988 | Evans |
| 4,974,236 | A | 11/1990 | Gurcan et al. |
| 5,304,937 | A | 4/1994 | Meyer |
| 5,305,017 | A | 4/1994 | Gerpheide |
| 5,648,642 | A | 7/1997 | Miller |
| 5,666,113 | A | 9/1997 | Logan |

(Continued)

FOREIGN PATENT DOCUMENTS

| | | | |
|---|---|---|---|
| EP | 0749086 | A1 | 12/1996 |
| EP | 1624399 | A1 | 2/2006 |

(Continued)

OTHER PUBLICATIONS

USPTO, Office Action in U.S. Appl. No. 13/233,781, mailed Jul. 18, 2013.

(Continued)

*Primary Examiner* — Jimmy H Nguyen

(74) *Attorney, Agent, or Firm* — Ingrassia Fisher & Lorenz P.C.

(57) ABSTRACT

A processing system includes transmitter module, receiver module, and a demodulating module. The transmitter module comprises transmitter circuitry and is configured to simultaneously transmit a first transmitter signal with a first transmitter electrode and a second transmitter signal with a second transmitter electrode. The first transmitter signal includes a combination of a first heterodyne frequency and a carrier frequency. The second transmitter signal comprises a combination of a second heterodyne frequency and the carrier frequency. The receiver module comprise receiver circuitry and is configured to receive a first resulting signal with a receiver electrode, wherein the first resulting signal comprises first effects corresponding to the first transmitter signal and second effects corresponding to the second transmitter signal. The demodulating module is configured to demodulate the first resulting signal to produce a plurality of demodulation signals, wherein the demodulating module comprises a first mixer, a second mixer, a third mixer, a first filter, a second filter and a third filter. The first mixer includes a mixing frequency corresponding to the carrier frequency, the second mixer includes a mixing frequency corresponding to the first heterodyne frequency, and the third mixer includes a mixing frequency corresponding to the second heterodyne frequency.

20 Claims, 8 Drawing Sheets

(56) References Cited

U.S. PATENT DOCUMENTS

| | | | | |
|---|---|---|---|---|
| 5,787,126 | A | 7/1998 | Itoh et al. | |
| 5,790,106 | A | 8/1998 | Hirano et al. | |
| 5,825,352 | A | 10/1998 | Bisset et al. | |
| 5,841,078 | A | 11/1998 | Miller | |
| 5,861,875 | A | 1/1999 | Gerpheide | |
| 5,880,411 | A | 3/1999 | Gillespie et al. | |
| 5,917,906 | A | 6/1999 | Thornton | |
| 5,940,526 | A | 8/1999 | Setlak et al. | |
| 5,963,679 | A | 10/1999 | Setlak | |
| 6,067,368 | A | 5/2000 | Setlak et al. | |
| 6,259,804 | B1 | 7/2001 | Setlak et al. | |
| 6,392,167 | B1 | 5/2002 | Nakagawa | |
| 6,570,557 | B1 | 5/2003 | Westerman et al. | |
| 6,621,487 | B2 | 9/2003 | Iwasaki et al. | |
| 6,704,005 | B2 | 3/2004 | Kato et al. | |
| 6,771,280 | B2 | 8/2004 | Fujisaki et al. | |
| 6,788,288 | B2 | 9/2004 | Ano | |
| 7,075,316 | B2 | 7/2006 | Umeda et al. | |
| 7,106,720 | B2 | 9/2006 | Ozluturk et al. | |
| 7,292,229 | B2 | 11/2007 | Morag et al. | |
| 7,333,089 | B1 * | 2/2008 | Gard | 345/157 |
| 7,372,455 | B2 | 5/2008 | Perski et al. | |
| 7,451,050 | B2 | 11/2008 | Hargreaves | |
| 7,616,786 | B2 | 11/2009 | Setlak | |
| 7,812,827 | B2 | 10/2010 | Hotelling et al. | |
| 7,868,874 | B2 | 1/2011 | Reynolds | |
| 8,338,724 | B2 | 12/2012 | Reynolds | |
| 2002/0049070 | A1 | 4/2002 | Bick | |
| 2002/0050983 | A1 | 5/2002 | Liu et al. | |
| 2002/0173337 | A1 | 11/2002 | Hajimiri et al. | |
| 2002/0185981 | A1 | 12/2002 | Dietz et al. | |
| 2003/0030628 | A1 | 2/2003 | Sato et al. | |
| 2003/0035570 | A1 | 2/2003 | Benkley, III | |
| 2003/0067449 | A1 | 4/2003 | Yoshikawa et al. | |
| 2003/0076306 | A1 | 4/2003 | Zadesky et al. | |
| 2003/0133432 | A1 | 7/2003 | Moerder | |
| 2004/0056785 | A1 | 3/2004 | Webster et al. | |
| 2004/0056849 | A1 | 3/2004 | Lohbihler et al. | |
| 2004/0081339 | A1 | 4/2004 | Benkley, III | |
| 2005/0005703 | A1 | 1/2005 | Saito et al. | |
| 2005/0024065 | A1 | 2/2005 | Umeda et al. | |
| 2005/0052425 | A1 | 3/2005 | Zadesky et al. | |
| 2005/0073324 | A1 | 4/2005 | Umeda et al. | |
| 2005/0122785 | A1 | 6/2005 | Umeda et al. | |
| 2005/0150697 | A1 | 7/2005 | Altman et al. | |
| 2006/0111074 | A1 * | 5/2006 | Petilli et al. | 455/334 |
| 2006/0293017 | A1 | 12/2006 | Kim et al. | |
| 2007/0047669 | A1 | 3/2007 | Mak et al. | |
| 2007/0062852 | A1 | 3/2007 | Zachut et al. | |
| 2007/0109274 | A1 | 5/2007 | Reynolds | |
| 2008/0158167 | A1 | 7/2008 | Hotelling et al. | |
| 2008/0192018 | A1 | 8/2008 | Park et al. | |
| 2009/0135973 | A1 | 5/2009 | He | |
| 2009/0143031 | A1 | 6/2009 | Shah | |
| 2009/0189867 | A1 | 7/2009 | Krah et al. | |
| 2009/0273579 | A1 | 11/2009 | Zachut et al. | |
| 2009/0322351 | A1 | 12/2009 | McLeod | |
| 2009/0322578 | A1 | 12/2009 | Petrovic | |
| 2010/0059295 | A1 | 3/2010 | Hotelling | |
| 2010/0060589 | A1 | 3/2010 | Wilson | |
| 2010/0060591 | A1 | 3/2010 | Yousefpor et al. | |
| 2010/0079083 | A1 * | 4/2010 | Seguine | 315/292 |
| 2010/0110037 | A1 | 5/2010 | Huang et al. | |
| 2010/0159858 | A1 | 6/2010 | Dent et al. | |
| 2010/0189197 | A1 | 7/2010 | Nakatani | |
| 2010/0321331 | A1 | 12/2010 | Oda et al. | |
| 2011/0037724 | A1 | 2/2011 | Paulsen et al. | |
| 2011/0063993 | A1 | 3/2011 | Wilson et al. | |
| 2011/0084857 | A1 | 4/2011 | Marino et al. | |
| 2012/0056841 | A1 | 3/2012 | Krenik et al. | |

FOREIGN PATENT DOCUMENTS

| | | | |
|---|---|---|---|
| KR | 20100042761 | A | 4/2010 |
| WO | 0247018 | A2 | 6/2002 |
| WO | 2004107146 | A2 | 12/2004 |

OTHER PUBLICATIONS

United States Patent and Trademark Office, U.S. Notice of Allowance dated Aug. 20, 2012 for U.S. Appl. No. 12,962,096.

Yam, Y.-O. et al. "Innovative Demodulation Method for SSB Technique" IEE Proc.-Circuits Devices Syst., vol. 146, No. 3, Jun. 1999.

West, J.D.K. "The Application of the Asymmetric Polyphase Filter in an SSB Transceiver" Grinel Natal Branch of Grinaker Electronics, IEEE 1991.

Chinese Patent Office "Chinese Office Action" for Application No. 200680042701.5 dated Sep. 14, 2011.

Korean Intellectual Property Office "International Search Report" mailed Feb. 23, 2012 for International Appln. No. PCT/US2011/051998, filed Sep. 16, 2011.

Japan Patent Office "Notice of Reasons for Rejection" mailed Feb. 29, 2012 for Patent Application No. P2008-541174.

USPTO, Ex parte Quayle Office Action for U.S. Appl. No. 13/679,355, mailed Apr. 5, 2013.

USPTO, Office Action for U.S. Appl. No. 13/161,267, mailed Apr. 4, 2013.

USPTO, Notice of Allowance and Fee(s) Due for U.S. Appl. No. 13/679,355, mailed Jun. 11, 2013.

United States Patent and Trademark Office, Office Action for U.S. Appl. No. 12/962,096, dated Jun. 19, 2012.

United States Patent and Trademark Office, Notice of Allowance for U.S. Appl. No. 12/962,110, dated Jul. 16, 2012.

The International Bureau of WIPO, PCT International Preliminary Report on Patentability in PCT International Application No. PCT/US2011/051998, mailed Mar. 28, 2013.

International Searching Authority, PCT Written Opinion of the International Searching Authority in PCT International Application No. PCT/US2011/051998, mailed Feb. 23, 2012.

USPTO, Final Office Action in U.S. Appl. No. 13/161,267, mailed Sep. 10, 2013.

United States Patent and Trademark Office, U.S. Office Action mailed Aug. 15, 2013 for U.S. Appl. No. 13/233,790.

Smith, et al.; "Code-Division Multiplexing of a Sensor Channel: A Software Implementation"; IEEE Journal; Apr. 1999; pp. 725-731; vol. 17, No. 4.

Cichocki, et al.; "A Switched-Capacitor Interface for Capacitive Sensors Based on Relaxation Oscillators"; IEEE Journal; Oct. 1990; pp. 797-799; vol. 39, No. 5.

Huang, et al.; "Electronic Transducers for Industrial Measurement of Low Value Capacitances"; J. Phys. E: Sci. Instrum. 21 1988; pp. 242-250; IOP Publishing Printed in the U.K.

Philipp, Hal; "Charge Transfer Sensing", pp. 1-9; Copyright 1997.

Zimmerman, et al.; "Applying Electric Field Sensing to Human-Computer Interfaces", MIT Media Laboratory; pp. 1-8; to be published in (IEEE SIG) CHI May 1995.

Yamada, et al.; "A Switched-Capacitor Interface for Capacitive Pressure Sensors", IEEE Journal; Feb. 1992; pp. 81-86; vol. 41, No. 1.

Smith, et al.; "Electric Field Sensing for Graphical Interfaces"; IEEE Computer Graphics and Applications; May/Jun. 1998; pp. 54-60.

Vigoda, Benjamin; "A Nonlinear Dynamic System for Spread Spectrum Code Acquisition"; MIT Media Laboratory; pp. 10-90, Aug. 9, 1999.

International Search Report for International Application No. PCT/US2006/040266, mailed Mar. 30, 2007.

Chinese Office Action 200680042701.5 dated May 25, 2011.

* cited by examiner

SYSTEM AND METHOD FOR SIGNALING IN SENSOR DEVICES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Proximity sensor devices typically incorporate either profile sensors or image sensors. Profile sensors alternate between multiple axes (e.g., x and y), while image sensors scan multiple transmitter rows to produce a more detailed "image" of "pixels" associated with an input object. While image sensors are advantageous in a number of respects, such sensors may be susceptible to interference at particular pixels, and attempts to address this issue often result in reduced scan times. Accordingly, there is a need for improved sensor systems and methods.

BRIEF SUMMARY OF THE INVENTION

A processing system in accordance with one embodiment of the present invention includes transmitter module, receiver module, and a demodulating module. The transmitter module comprises transmitter circuitry and the transmitter module is configured to simultaneously transmit a first transmitter signal with a first transmitter electrode and a second transmitter signal with a second transmitter electrode, wherein the first transmitter signal comprises a combination of a first heterodyne frequency and a carrier frequency and the second transmitter signal comprises a combination of a second heterodyne frequency and the carrier frequency. The receiver module comprises receiver circuitry and the receiver module is configured to receive a first resulting signal with a receiver electrode, wherein the first resulting signal comprises first effects corresponding to the first transmitter signal and second effects corresponding to the second transmitter signal. The demodulating module is configured to demodulate the first resulting signal to produce a plurality of demodulation signals, wherein the demodulating module comprises a first mixer, a second mixer, a third mixer, a first filter, a second filter and a third filter, wherein the first mixer comprises a mixing frequency corresponding to the carrier frequency, the second mixer comprises a mixing frequency corresponding to the first heterodyne frequency, and the third mixer comprises a mixing frequency corresponding to the second heterodyne frequency.

A method in accordance with one embodiment of the present invention includes simultaneously transmitting a first transmitter signal with a first transmitter electrode and a second transmitter signal with a second transmitter electrode, wherein the first transmitter signal comprises a combination of a first heterodyne frequency and a carrier frequency, and the second transmitter signal comprises a combination of a second heterodyne frequency and the carrier frequency; receiving a first resulting signal with a receiver electrode, wherein the first resulting signal comprises first effects corresponding to the first transmitter signal and second effects corresponding to the second transmitter signal; and demodulating the first resulting signal to produce a plurality of demodulation signals via a first mixer, a second mixer, a third mixer, a first filter, a second filter and a third filter, wherein the first mixer comprises a mixing frequency corresponding to the carrier frequency, the second mixer comprises a mixing frequency corresponding to the first heterodyne frequency, and the third mixer comprises a mixing frequency corresponding to the second heterodyne frequency, wherein a first demodulation signal of the plurality of demodulation signals is produced via the second mixer and the second filter and a second demodulation signal of the plurality of demodulation signals is produced via the third mixer and the third filter and wherein the first demodulation signal comprises the first effects the second demodulation signal comprises the second effects.

A capacitive sensor device in accordance with one embodiment of the invention includes a first transmitter electrode, a second transmitter electrode, and a processing system communicatively coupled to the first transmitter electrode and receiver electrode. The processing system is configured to: simultaneously transmit a first transmitter signal with a first transmitter electrode and a second transmitter signal with a second transmitter electrode, wherein the first transmitter signal comprises a combination of a first heterodyne frequency and a carrier frequency and the second transmitter signal comprises combination of a second heterodyne frequency and the carrier frequency; receive a first resulting signal with a receiver electrode, wherein the first resulting signal comprises first effects corresponding to the first transmitter signal and second effects corresponding to the second transmitter signal; and demodulate the first resulting signal to produce a plurality of demodulation signals, wherein the demodulating module comprises a first mixer, a second mixer, a third mixer, a first filter, a second filter and a third filter, wherein the first mixer comprises a mixing frequency corresponding to the carrier frequency, the second mixer comprises a mixing frequency corresponding to the first heterodyne frequency, and the third mixer comprises a mixing frequency corresponding to the second heterodyne frequency; acquire a first measurement of a change in capacitive coupling between the first transmitter electrode and the receiver electrode, the measurement based on a first demodulation signal of the plurality of demodulation signals; acquire a second measurement of a change in capacitive coupling between the second transmitter electrode and the receiver electrode, the measurement based on a second demodulation signal of the plurality of demodulation signals; and determine positional information for the input device based on the first and second measurements.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
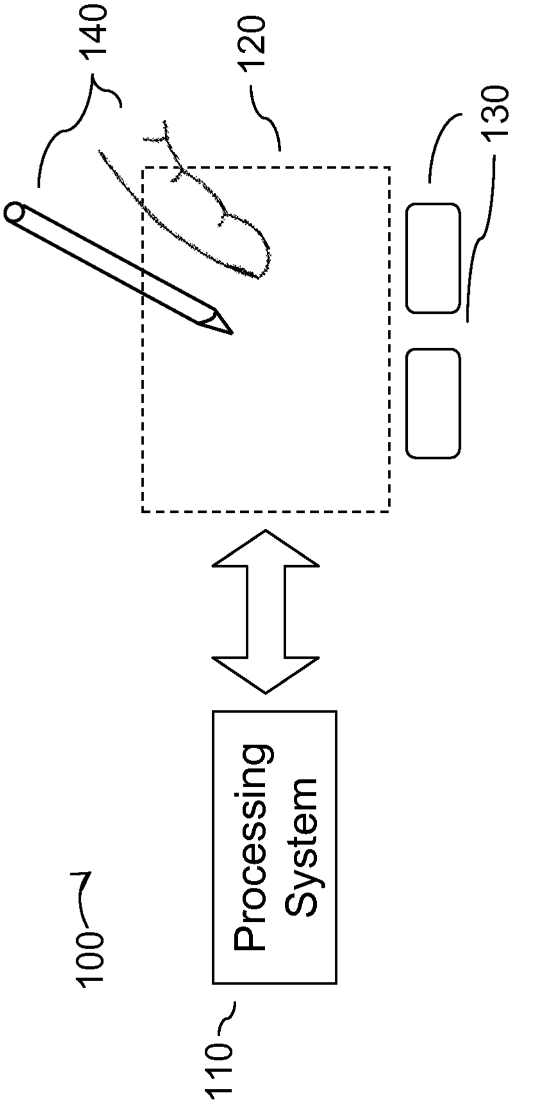
FIG. 1 is a block diagram of an exemplary system that includes an input device in accordance with an embodiment of the invention.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Figure 2:
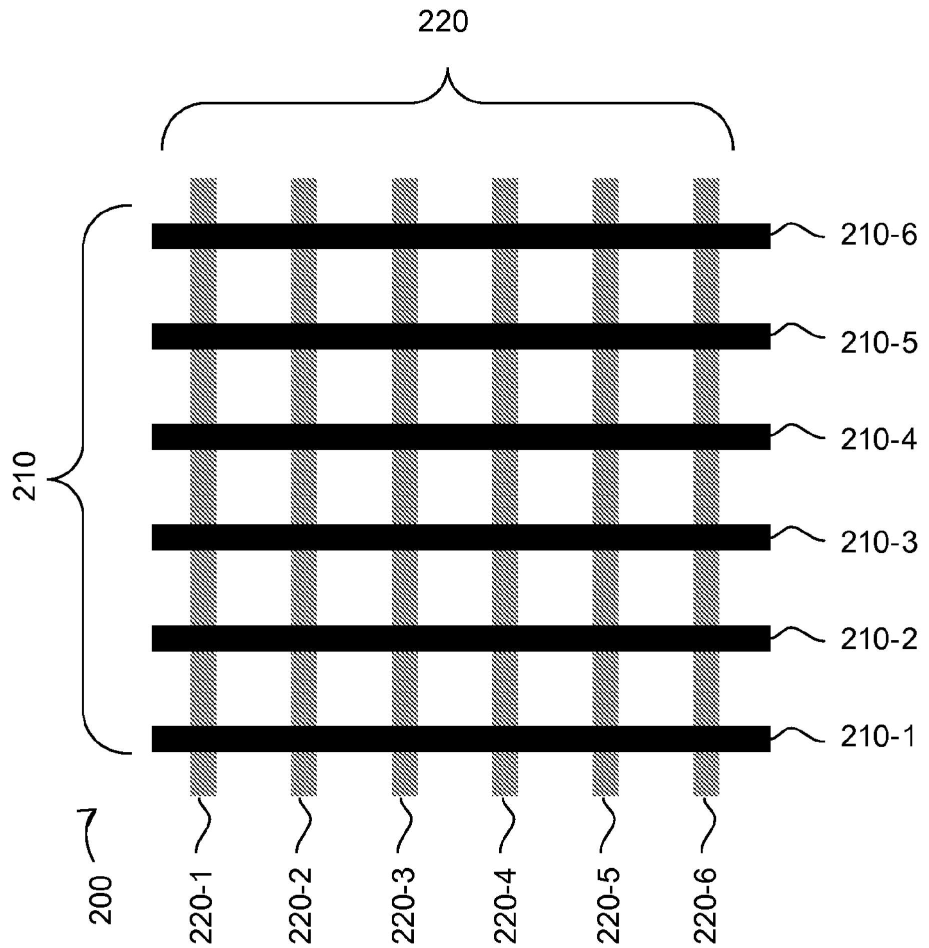
FIG. 2 is a block diagram of sensing electrodes in accordance with an exemplary embodiment of the invention.

In this regard, FIG. 2 illustrates, conceptually, an exemplary set of capacitive sensor electrodes 200 configured to sense in a sensing region. For clarity of illustration and description, FIG. 2 shows a pattern of simple rectangles; however, it will be appreciated that the invention is not so limited, and that a variety of electrode patterns may be suitable in any particular embodiment. In one embodiment, sensor electrodes 210 are configured as receiver electrodes and sensor electrodes 220 are configured as transmitter electrodes. In other embodiments, sensor electrodes 210 are configured to sense object position and/or motion in the X direction and sensor electrodes 220 are configured to sense object position and/or motion in the Y direction.

Sensor electrodes 210 and 220 are typically ohmically isolated from each other. That is, one or more insulators separate sensor electrodes 210 and 220 and prevent them from electrically shorting to each other. In some embodiments, sensor electrodes 210 and 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and 220 are separated by one or more layers of insulative material. In some other embodiments, sensor electrodes 210 and 220 are separated by one or more substrates; for example, they may be disposed on opposite sides of the same substrate, or on different substrates that are laminated together. The capacitive coupling between the transmitter electrodes and receiver electrodes change with the proximity and motion of input objects in the sensing region associated with the transmitter electrodes and receiver electrodes.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, as described in further detail below, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings. A set of measured values from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 (including, for example, the various sensor electrodes 200 of FIG. 2) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes a determination module configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 3:
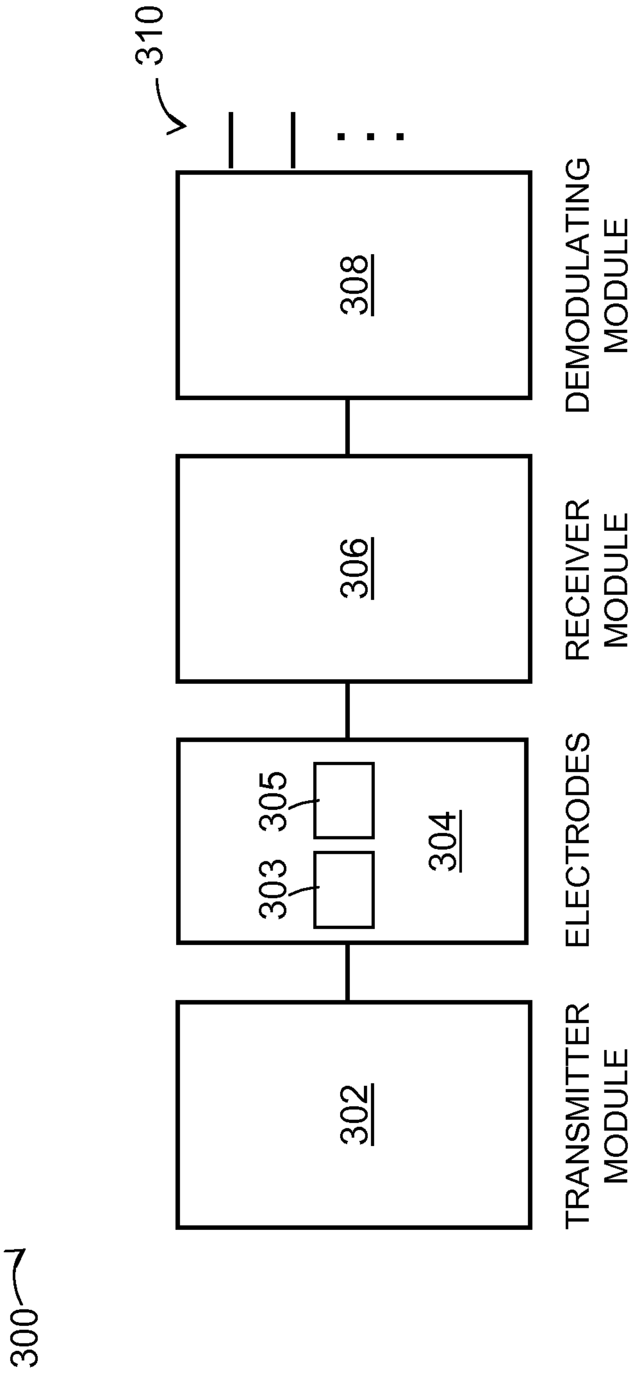
FIG. 3 is a conceptual block diagram depicting an exemplary embodiment of the present invention.

Referring now to the conceptual block diagram depicted in FIG. 3, various embodiments of an exemplary processing system 110 as shown in FIG. 1 may include a system 300. System 300, as illustrated, generally includes transmitter module 302 communicatively coupled via a set of electrodes (or simply "electrodes") 304 to receiver module 306. Receiver module 306 is coupled to demodulating module 308, which is configured to produce a plurality of demodulation signals 310, as described in further detail below. Electrodes 304 include one or more transmitter electrodes 303 and one or more receiver electrodes 305. In one embodiment, for example, transmitter electrodes 303 and receiver electrodes 305 are implemented as described above in connection with FIG. 2.

Transmitter module 302 includes any combination of hardware and/or software configured to transmit transmitter signals with transmitter electrodes 303. In one embodiment, transmitter module 302 comprises transmitter circuitry and transmitter module 302 is configured to simultaneously transmit a first transmitter signal with a first transmitter electrode of transmitter electrodes 303 and transmit a second transmitter signal with a second transmitter electrode of transmitter electrodes 303. In other embodiment, the transmitter module 302 is configured to simultaneously transmit any number of transmitter signals with respective transmitter electrodes 303. The transmitter signals may comprise any one of a sinusoidal waveform, square waveform, triangular waveform, sawtooth waveform or the like. In one embodiment, the frequency of each of the transmitter signals comprises a carrier frequency combined with a particular heterodyne frequency. That is, one transmitter signal may comprise the carrier frequency combined with a first heterodyne frequency, while a second transmitter signal comprises the carrier frequency combined with a second heterodyne frequency. These transmitter signals are transmitted with respective transmitter electrodes 303 as described above (e.g., electrodes 220-1 and 220-2 of FIG. 2). In one embodiment, the heterodyne frequencies may be linearly associated with the transmitter signals. In another embodiment, the heterodyne frequencies may be non-linearly associated with the transmitter signals. In one embodiment, for example, each heterodyne frequency is equal to the sum of a constant frequency (e.g., a fundamental frequency) and an integer multiple of a predetermined frequency. In one embodiment, the transmitter signals are substantially orthogonal to each other. In one embodiment, the transmitter signals are substantially orthogonal in frequency. In other embodiments, the transmitter signals are substantially orthogonal in phase, substantially orthogonal in code, and/or substantially orthogonal in time.

Receiver module 306 includes any combination of hardware and/or software configured to receive resulting signals with receiver electrodes 305. As described above, a resulting signal will generally comprise effects corresponding to one or more transmitter signals received by transmitter electrodes 303, and/or to one or more sources of environmental interference. In one embodiment, receiver module 306 comprises receiver circuitry and receiver module 306 is configured to receiver resulting signals with receiver electrodes.

Demodulation module 308 includes any combination of hardware and/or software configured to demodulate resulting signals received from receiver module 306 to produce a plurality of demodulation signals 310. Demodulation signals may then be received by other modules, such as a determination module (not illustrated) for determining positional information for an input object as shown in FIG. 1.

Figure 4:
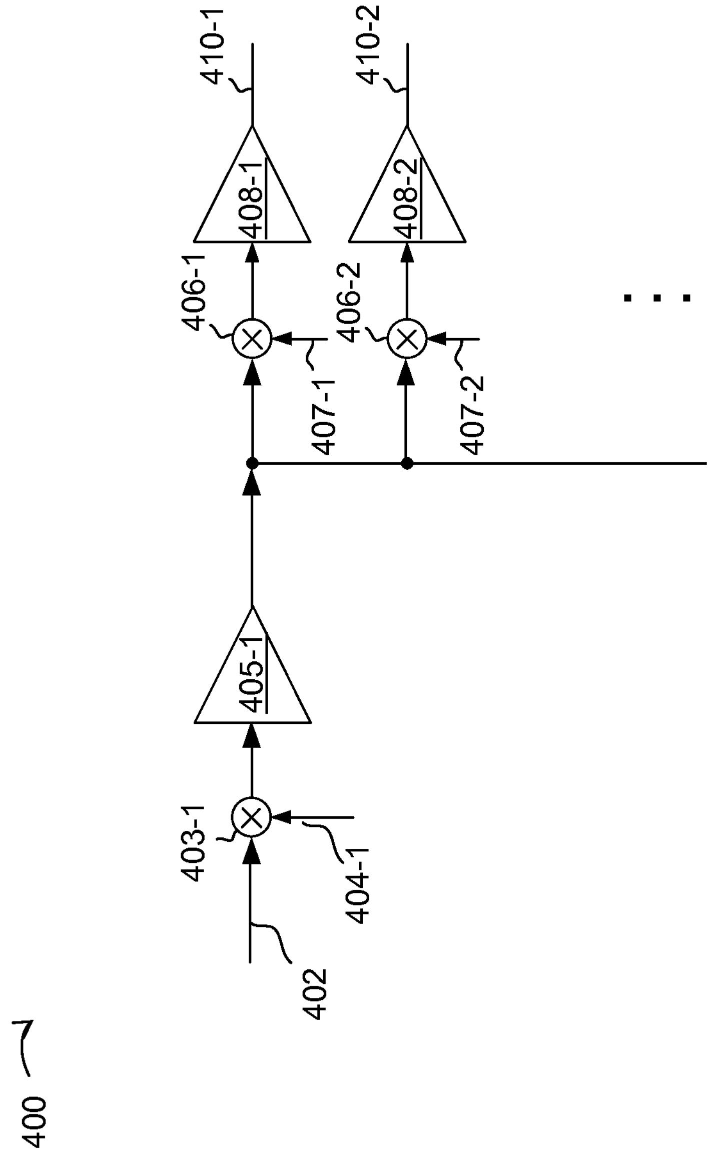
FIG. 4 is a schematic diagram of demodulating module circuitry in accordance with one embodiment of the invention.

FIG. 4 is a schematic diagram of exemplary demodulating module circuitry (or simply "circuitry") 400 suitable for use in the demodulation module 308 of FIG. 1. In this regard, it will be appreciated that FIG. 4 provides a simplified schematic, and that practical embodiments may include additional circuit components. For example, while FIG. 4 depicts a single receiver channel, multiple parallel receiver channels will typically be employed. Additional filters and mixers may be incorporated into circuitry 400, and/or the illustrated circuit components may be arranged in a variety of topologies.

In general, a resulting signal 402 (e.g., received by receiver module 306 of FIG. 3) is combined via a mixer 403-1 with a mixing frequency 404-1, e.g., carrier frequency $f_c$. Mixing frequency 404-1 may be sinusoidal, square, triangular, or any other suitable wave shape, including a three-level (or more) waveform as described in further detail below. The output of mixer 403-1 is then processed by a filter 405-1 and plurality of additional mixers (406-1, 406-2, etc.) coupled to filter 405-1 as shown. Each additional mixer (406-1, 406-2) is coupled to a respective filter—i.e., 408-1 and 408-2—and is configured to combine the output of filter 405-1 with respective mixing frequencies (407-1, 407-2) to produce respective demodulation signals (410-1, 410-2). Mixing frequencies 407-1 and 407-2 correspond with the heterodyne frequencies selected for the transmitter signals, as described above. In one embodiment the mixers may be sine wave or square wave demodulating mixers. In one embodiment, the filters may be low pass filters, band pass filters and the like.

Depending upon the application and other factors, one or more of mixers 403-1, 406-1 and 406-2 and filters 405-1, 408-1 and 408-2 may be analog or digital. For example, in one embodiment, mixers 406-1 and 406-2, as well as filters 408-1 and 408-2, are digital, while mixer 403-1 and filter 405-1 are analog. In another embodiment, mixers 403-1, 406-1, and 406-2, as well as filters 405-1, 408-1, and 408-2, are digital. Filters 408 may, for example, be a box car filters or the like. In a further embodiment, the functionality provided by mixer 406-1, mixer 406-2, filter 408-1, and filter 408-2 may be provided by one or more other software or hardware components. For example, mixers 406 and filters 408 may be implemented as a fast Fourier transform (FFT) or Goertzel transform, as is known in the art. In such embodiments, at least one analog-to-digital converter, such as optional analog-to-digital converter 411, may be included anywhere along demodulating module circuitry 400.

In one embodiment, mixing frequency 404-1 comprises a mixing frequency corresponding to a carrier frequency $f_c$, and mixing frequency 407-1 corresponds to a first heterodyne frequency (e.g., $f_m+0\Delta f$), and mixing frequency 407-2 corresponds to a second heterodyne frequency (e.g., $f_m+1\Delta f$) where $f_m$ is a fundamental frequency, and $\Delta f$ is a frequency delta. Similarly, in one embodiment, for any set of N mixers 406 (406-1, 406-2 . . . , 406-N), mixer i has a heterodyne frequency of $f_m+(i-1)\Delta f$. In other embodiments, each mixer has a heterodyne frequency corresponding to a respective frequency of a transmitter signal.

Figure 5:
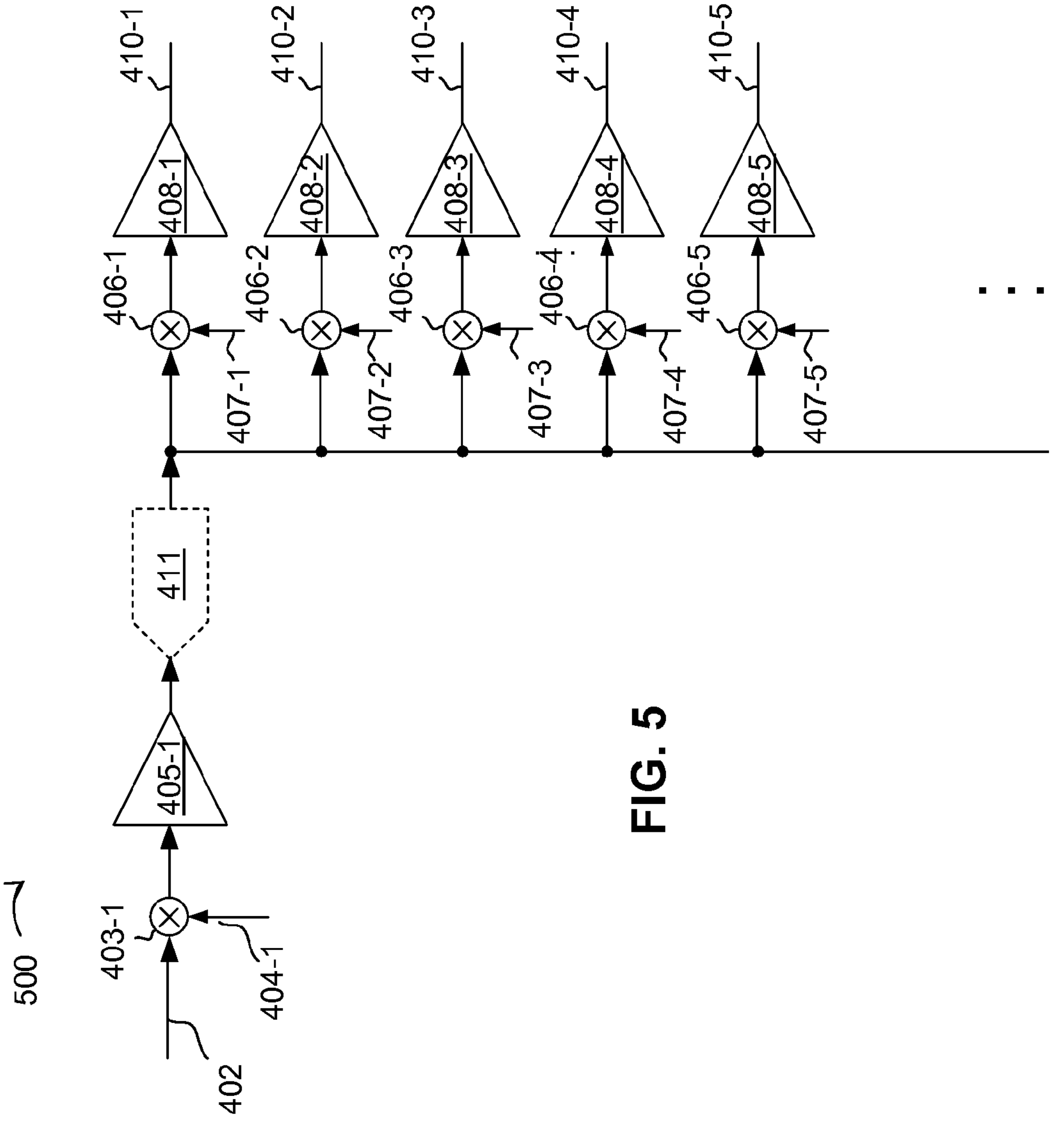
FIG. 5 is a schematic diagram of demodulating module circuitry in accordance with another embodiment of the invention.

While FIG. 4 depicts an exemplary demodulation module that includes three mixers 406, any number of such mixers might be included in a typical embodiment. FIG. 5, for example, depicts exemplary demodulation module circuitry 500 also suitable for use as the demodulation module 308 of FIG. 1. In the illustrated embodiment, six mixers (406-1 through 406-5) are coupled to respective filters (408-1 through 408-5) to produce demodulation signals 410-1 through 410-5. In some embodiments, each transmitter signal has a corresponding mixer and filter. In various embodiments, as the number of simultaneously transmitter signals is increased, the number of corresponding mixers and filters also increases. In some embodiments, different transmitter signals may correspond to the same mixer and filter. In such an embodiment, the mixing frequency of the mixer changes to correspond with the transmitted transmitter signal. Also depicted is an optional analog-to-digital converter 411 which might be advantageous in some embodiments. The placement of optional ADC 411 might also vary depending upon the application. For example, in some embodiments optional ADC 411 is placed upstream of filter 405-1 and/or accompanied by an additional, downstream filter (not illustrated). In other embodiments, multiple ADCs may be used.

Figure 6:
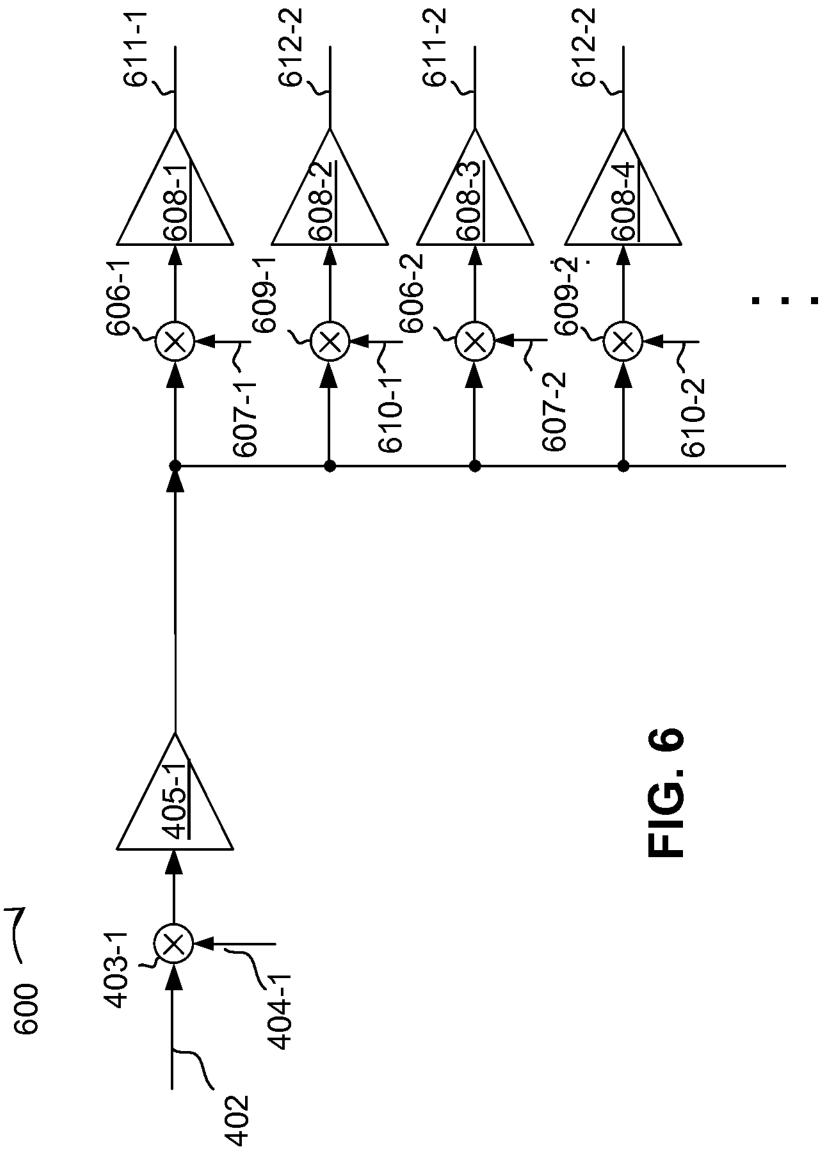
FIG. 6 is a schematic diagram of demodulating module circuitry in accordance with another embodiment of the invention.

FIG. 6 depicts another embodiment of demodulation module circuitry 600 also suitable for use as the demodulation module 308 of FIG. 1. In one embodiment, one or more pairs of mixers 606 are configured to be at the same frequency, but in quadrature with respect to each other. In this way, interference associated with one transmitter signal effectively corresponds to the output of the mixers configured in quadrature. For example, in a particular embodiment, mixer 609-1 comprises a similar frequency and is in quadrature with mixer 606-1, and mixer 609-2 comprises a similar frequency but is in quadrature with mixer 606-2 Further, demodulation signals 612-1 and 612-2 may be referred to as quadrature signals and demodulation signal 611-1 and 611-2 may be referred to as in-phase signals, such that demodulation signal 612-1 is in quadrature with demodulation signal 611-1 and demodulation signal 612-2 is in quadrature with demodulation signal 611-2. The quadrature signals 612-1 and 612-2 may be used to determine the interference on corresponding in-phase signals and corresponding transmitter signals. Further, the in-phase signals 610-1 and 610-2 may be used to determine positional information for input objects.

In various embodiments, a quadrature signal (e.g., demodulation signal 612-1 or 612-2) comprising any non-zero value may be determined to comprise significant interference. In one embodiment, if either quadrature signal is determined to comprise significant interference, processing system 110 may shift corresponding transmitter signals to a different transmitter signal. In one embodiment, this may comprise changing the heterodyne frequency of only those transmitter signals corresponding to quadrature signals having significant interference. In other embodiments, the carrier frequency may be changed, effectively changing the frequency of each transmitter signal. In another embodiment, this may comprise selecting a different transmitter signal having a different heterodyne frequency. In one embodiment, a comparison between each quadrature signal and a corresponding in-phase signal may be made to reduce the interference of the in-phase signal.

Figure 7:
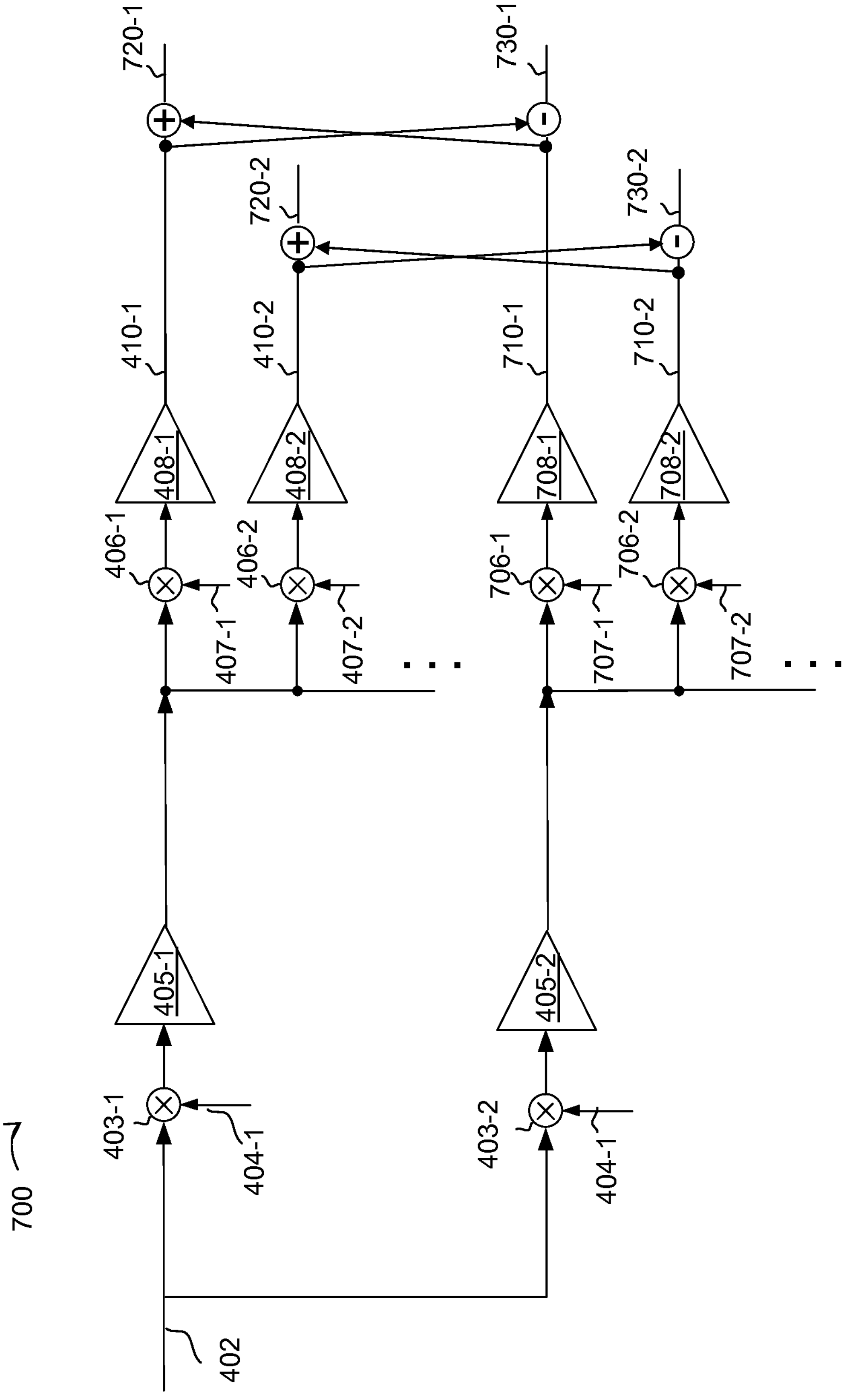
FIG. 7 is a schematic diagram of demodulating module circuitry in accordance with another embodiment of the invention.

FIG. 7 depicts a further embodiment of demodulation module circuitry 700 also suitable for use as the demodulation module 308 of FIG. 1. In the illustrated embodiment, six mixers (403-1, 403-2, 406-1, 406-2, 706-1 and 706-2) are coupled to respective filters (405-1, 405-2, 408-1, 408-2, 708-1 and 708-2) to produce output signals 410-1, 410-2, 710-1 and 710-2. Further, mixer 403-2 comprises a similar frequency and is in quadrature with mixer 403-1, mixer 706-1 comprises a similar frequency and is in quadrature with mixer 406-1, and mixer 706-2 comprises a similar frequency and is in quadrature with mixer 406-2. In one embodiment, mixers 403-1 and 403-2 correspond to a first mixing stage and mixer 406-1, 406-2, 706-1 and 706-2 correspond to a second mixing stage. Furthermore, one or more pairs of output signals 410 and 710 are configured to provide corresponding demodulation signals. In one embodiment, the demodulation signals correspond to upper and lower sideband signals. That is, output signals 410-1 and 710-1 are combined (via mixers or the like, as shown) to produce a first demodulation signal 720-1 and a second demodulation signal 730-1. Similarly, output signals 410-2 and 710-2 are combined to produce a third demodulation signal 720-2 and a fourth demodulation signal 730-2.

In many embodiments, the demodulation signal used to determine positional information for input objects corresponds to a relationship between the transmitter signal frequency and the mixing frequency of the first mixing stage (e.g., mixing frequency 404-1 and 704-1). For example, in one embodiment, the mixing frequency of the first mixing stage is less than the transmitter signal frequency; and a first demodulation signal (e.g., 720-1 and 720-2) may be used to determine positional information for input objects and a second demodulation signal (e.g., 730-1 and 730-2) may be analyzed for interference. In another embodiment, the mixing frequency of the first mixing stage is greater than the transmitter signal frequency; and a first demodulation signal (e.g., 730-1 or 730-2) may be used to determine positional information for input objects and a second demodulation signal (e.g., 720-1 or 720-2) may be analyzed for interference. In one embodiment, a first demodulation signal (e.g., 720-1 and 720-2) corresponds to an upper sideband signals and a second demodulation signal (e.g., 730-1 or 730-2) correspond to a lower sideband signal. Depending on the relationship between relationship between the transmitter signal frequency and the mixing frequency of the first mixing stage, either the upper or lower sideband may be used for determining positional information for an input object or analyzed for interference.

In one embodiment, processing system 110 may shift from transmitting the first transmitter signal to transmitting a second transmitter signal based on the interference of the second demodulation signal, where the second transmitter signal corresponds to the second demodulation signal. In another embodiment, processing system 110 may shift from transmitting the second transmitter signal to transmitting a first transmitter signal based on the interference of the first demodulation signal, where the first transmitter signal corresponds to the first demodulation signal. In various embodiments, a demodulation signal may be determined to comprise interference when it comprises any non-zero value. Further, in other embodiments, processing system 110 may change the carrier frequency, allowing a third transmitter signal to be analyzed for interference.

In other embodiments, processing system 110 simultaneously transmits a first transmitter signal with a first frequency with a first transmitter electrode, and a second transmitter signal with a second frequency with a second transmitter electrode. In such embodiments, either demodulation signal 720-1 or 730-1 corresponds to the first transmitter signal and either demodulation signal 720-2 or 730-2 corresponds to the second transmitter signal, and may be used to determine positional information for input objects. In embodiments where the mixing frequency of the first mixing stage is less than the frequency of the transmitted signal, demodulation signals 720 (e.g., 720-1 and 720-2) may be used to determine positional information for input object and demodulation signals 730 (e.g., 730-1 and 730-2) may be analyzed for interference. In other embodiments where the mixing frequency of the first mixing stage is greater than the frequency of the transmitted signal, demodulation signals 730 (e.g., 730-1 and 730-2) may be used to determine positional information for input object and demodulation signals 710 (e.g., 710-1 and 710-2) may be analyzed for interference. Processing system 110 may shift from transmitting a first transmitter signal to transmitting a second transmitter signal based on the interference of the analyzed demodulation signals.

In a further embodiment, elements of embodiment of FIG. 6 may be combined with elements embodiment of FIG. 7. For example, in one embodiment, a seventh mixer coupled to a seventh filter and an eighth mixer coupled to an eight filter are coupled to the output of filter 405-1, the seventh mixer comprises a similar mixer frequency and is in quadrature with mixer 406-1, the eighth mixer comprises a similar mixer frequency and is in quadrature with mixer 406-2. Further, a ninth mixer coupled to a ninth filter and a tenth mixer coupled to a tenth filter may be coupled to the output of filter 708-1, the ninth mixer comprises a similar mixer frequency and is in quadrature with mixer 706-1, the tenth mixer comprises a similar mixer frequency and is in quadrature with mixer 706-2. The output signal of the seventh mixer and seventh filter may be combined with the output signal of the ninth mixer and ninth filter to produce further demodulation signals in quadrature with output signals 720-1 and 730-1 and the output signal of the eighth mixer and eighth filter may be combined with the output signal of the tenth mixer and tenth filter to produce yet other demodulation signals in quadrature with output signals 720-2 and 730-2. As discussed above, the quadrature signals may be used to determine the amount of interference on corresponding in-phase signals. For example, the output signal in quadrature with 720-1 may be analyzed to determine the amount of interference on corresponding in-phase signal 720-1. In one embodiment, processing system 110 may shift a transmitter signals to a different transmitter signal based on the interference of a corresponding quadrature signal. In another embodiment, a comparison between each quadrature signal and a corresponding in-phase signal may be made to reduce the interference of the in-phase signal.

Figure 8:
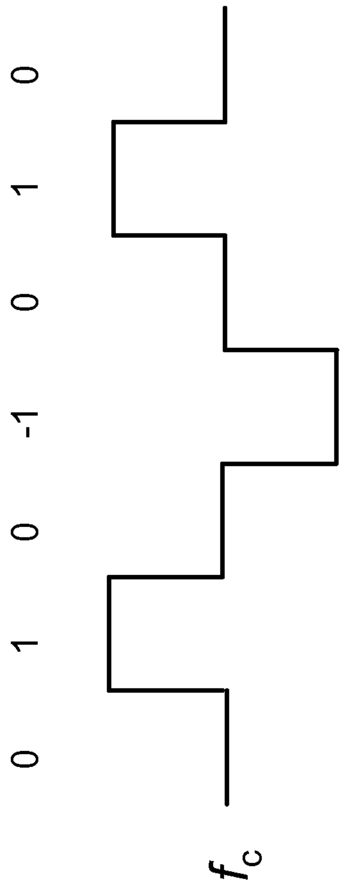
FIG. 8 is a timing diagram depicting a mixing signal in accordance with one embodiment of the invention.

Mixing signals, such as those illustrated in FIGS. 3-6, may take a variety of forms. For example, a particular mixing signal may be a square waveform, a sinusoidal waveform, a triangular waveform, a sawtooth waveform or the like. In one embodiment, one or more mixing signals have a multi-level square waveform. For example, in the embodiment illustrated in FIG. 8, a mixing signal as shown may exhibit three levels $\{-1, 0, 1\}$ relative to the carrier frequency, wherein the levels progress in an alternating pattern such as {0,1,0,−1,0,1,0, −1 . . . }. In a particular embodiment, the three-level mixer waveform of FIG. 8 is used in connection with at least mixer 403-1 of FIG. 4. A three-level mixer waveform may substantially suppress any effects due to a third harmonic or a fifth harmonic of the transmitter signal. In other embodiments, the mixing signal is not limited to having three levels and may exhibit more than three levels. In one embodiment, a five-level mixer waveform may be used to substantially suppress any effects due to third and fifth harmonics of the transmitter signal. In other embodiments, further multi-level mixing waveforms may be used to substantially suppress further harmonics of the transmitter signal. Multi-level mixing waveforms may reduce harmonic sensitivities of the demodulator. In one embodiment, by incorporating multi-level mixing signals the mixer (e.g., 403-1, 406-1 and 406-2) specifications and filter (e.g., 405-1, 408-1 and 408-2) specifications may be relaxed. Relaxed mixer and filter specifications may allow for the inclusion of mixers and/or filters having reduced complexity, area, and power.

Referring again to FIG. 3, in accordance with various embodiments of the invention, transmitter module 302 is configured to adjust, modify, or select various characteristics of the transmitter signals based on one or more attributes of those signals, the resulting signals, or the like. In one embodiment, for example, transmitter module 302 is configured to selectably transmit a transmitter signal to an electrode 303 based on the interference associated with one of those transmitter signals. Transmitter module 302 selects between two or more transmitter signals in order to minimize interference associated with those signals. In various embodiments, in response to a shifting from a first to a second transmitter signal, the current capacitive frame determined using the first transmitter signal may be discarded and a new capacitive frame may be acquired based on the second transmitter signal.

In another embodiment, at least two heterodyne frequencies associated with respective transmitter electrodes 303 are selected based on interference associated with at least one of those heterodyne frequencies. In yet another embodiment, the phase of one transmitter signal relative to another transmitter signal is selected based on a peak-to-average ratio of the first transmitter signal and the second transmitter signal. In accordance with another embodiment, the transmitter module 302 is configured to adjust the carrier signal $f_c$ based on some attribute of one or more of the transmitter signals. For example, transmitter module 302 may adjust the carrier signal based on interference associated with one or more of the transmitter signals.

In the above embodiments, it is advantageous for the transmitted signals to be substantially orthogonal in terms of time, frequency, or the like—i.e., exhibit very low cross-correlation, as is known in the art. In this regard, two signals may be considered substantially orthogonal even when those signals do not exhibit strict, zero cross-correlation. In a particular embodiment, for example, the transmitted signals include pseudo-random sequence codes. In other embodiments, Walsh codes, Gold codes, or another appropriate quasi-orthogonal or orthogonal codes are used.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:

transmitter module comprising transmitter circuitry, the transmitter module configured to simultaneously transmit a first transmitter signal with a first transmitter electrode and a second transmitter signal with a second transmitter electrode, wherein the first transmitter signal comprises a combination of a first heterodyne frequency and a carrier frequency and the second transmitter signal comprises a combination of a second heterodyne frequency and the carrier frequency;

receiver module comprising receiver circuitry, the receiver module configured to receive a first resulting signal with a receiver electrode, wherein the first resulting signal comprises first effects corresponding to the first transmitter signal and second effects corresponding to the second transmitter signal; and a demodulating module configured to demodulate the first resulting signal to produce a plurality of demodulation signals, wherein the demodulating module comprises a first mixer, a second mixer, a third mixer, a first filter, a second filter and a third filter, wherein the first mixer comprises a mixing frequency corresponding to the carrier frequency, the second mixer comprises a mixing frequency corresponding to the first heterodyne frequency, and the third mixer comprises a mixing frequency corresponding to the second heterodyne frequency.

2. The processing system of claim 1, wherein:

the second mixer and the second filter produce a first demodulation signal of the plurality of demodulation signals;

the third mixer and the third filter produce a second demodulation signal of the plurality of demodulation signals;

the second demodulation signal comprises the second effects; and the first demodulation signal comprises the first effects.

3. The processing system of claim 1, wherein:

the demodulating module comprises an analog to digital converter; and the second mixer, the third mixer, the second filter, and the third filter are digital.

4. The processing system of claim 3, wherein the first mixer and the first filter are digital.

5. The processing system of claim 1, wherein the demodulating module further comprises a fourth mixer, a fifth mixer, a sixth mixer, a fourth filter, a fifth filter, and a sixth filter, wherein the fourth mixer is in quadrature with the first mixer, the fifth mixer is in quadrature with the second mixer, and the sixth mixer is in quadrature with the third mixer.

6. The processing system of claim 5, wherein an output of the second mixer and the second filter and an output of the fifth mixer and the fifth filter are combined to produce a first demodulation signal of the plurality of demodulation signals and a second demodulation signal of the plurality of demodulation signals; and wherein an output of the third mixer and the third filter and an output of the sixth mixer and sixth filter are combined to produce a third demodulation signal of the plurality of demodulation signals and a fourth demodulation signal of the plurality of demodulation signals.

7. The processing system of claim 1, wherein the demodulating module further comprises a fourth mixer and a fourth filter, wherein the fourth mixer is in quadrature with the first mixer, and wherein interference associated with the first transmitter signal corresponds to the output of the fourth mixer and the fourth filter.

8. The processing system of claim 1, wherein the mixing signal of the first mixer comprises a three-level waveform.

9. The processing system of claim 1, wherein the transmitter module is configured to selectably transmit a third transmitter signal with the first transmitter electrode based on interference associated with the first transmitter signal.

10. The processing system of claim 1, wherein the transmitter module is configured to adjust the carrier frequency based on interference associated with at least one of the first transmitter signal and the second transmitter signal.

11. A method of capacitive sensing, the method comprising:

simultaneously transmitting a first transmitter signal with a first transmitter electrode and a second transmitter signal with a second transmitter electrode, wherein the first transmitter signal comprises a combination of a first heterodyne frequency and a carrier frequency, and the second transmitter signal comprises a combination of a second heterodyne frequency and the carrier frequency;

receiving a first resulting signal with a receiver electrode, wherein the first resulting signal comprises first effects corresponding to the first transmitter signal and second effects corresponding to the second transmitter signal; and demodulating the first resulting signal to produce a plurality of demodulation signals via a first mixer, a second mixer, a third mixer, a first filter, a second filter and a third filter, wherein the first mixer comprises a mixing frequency corresponding to the carrier frequency, the second mixer comprises a mixing frequency corresponding to the first heterodyne frequency, and the third mixer comprises a mixing frequency corresponding to the second heterodyne frequency, wherein a first demodulation signal of the plurality of demodulation signals is produced via the second mixer and the second filter and a second demodulation signal of the plurality of demodulation signals is produced via the third mixer and the third filter and wherein the first demodulation signal comprises the first effects the second demodulation signal comprises the second effects.

12. The method of claim 11, further comprising selectably transmitting a third transmitter signal with the first transmitter electrode based on interference associated with the first transmitter signal.

13. The method of claim 11, further including adjusting the carrier frequency based on interference associated with at least one of the first transmitter signal and the second transmitter signal.

14. The method of claim 11, further including demodulating the first resulting signal to produce the plurality of demodulation signals via a fourth mixer, a fifth mixer, a sixth mixer, a fourth filter, a fifth filter, and a sixth filter, such that the fourth mixer is in quadrature with the first mixer, the fifth mixer is in quadrature with the second mixer, and the sixth mixer is in quadrature with the third mixer.

15. The method of claim 11, further including demodulating the first resulting signal to produce the plurality of demodulation signals via a fourth mixer and a fourth filter, wherein the fourth mixer is in quadrature with the first mixer, and wherein interference associated with the first transmitter signal corresponds to the output of the fourth mixer and the fourth filter.

16. The method of claim 11, wherein the a mixing signal of the first mixer is a three-level waveform.

17. A capacitive sensor device comprising:

a first transmitter electrode;

a second transmitter electrode;

a receiver electrode; and a processing system communicatively coupled to the first transmitter electrode and receiver electrode, the processing system configured to:

simultaneously transmit a first transmitter signal with the first transmitter electrode and a second transmitter signal with a second transmitter electrode, wherein the first transmitter signal comprises a combination of a first heterodyne frequency and a carrier frequency and the second transmitter signal comprises combination of a second heterodyne frequency and the carrier frequency;

receive a first resulting signal with a receiver electrode, wherein the first resulting signal comprises first effects corresponding to the first transmitter signal and second effects corresponding to the second transmitter signal; and demodulate the first resulting signal with a demodulating module to produce a plurality of demodulation signals, wherein the demodulating module comprises a first mixer, a second mixer, a third mixer, a first filter, a second filter and a third filter, wherein the first mixer comprises a mixing frequency corresponding to the carrier frequency, the second mixer comprises a mixing frequency corresponding to the first heterodyne frequency, and the third mixer comprises a mixing frequency corresponding to the second heterodyne frequency;

acquire a first measurement of a change in capacitive coupling between the first transmitter electrode and the receiver electrode, the measurement based on a first demodulation signal of the plurality of demodulation signals;

acquire a second measurement of a change in capacitive coupling between the second transmitter electrode and the receiver electrode, the measurement based on a second demodulation signal of the plurality of demodulation signals; and determine positional information for an input object based on the first and second measurements.

18. The capacitive sensor device of claim 17, wherein the processing system is further configured to perform interference compensation based on interference associated with at least one of the first transmitter signal and the second transmitter signal, wherein the interference compensation includes at least one of (a) selectably transmitting a third transmitter signal with the first transmitter electrode; and (b) adjusting the carrier signal.

19. The capacitive sensor device of claim 17, wherein the processing system is further configured to perform the demodulation via a fourth mixer, a fifth mixer, a sixth mixer, a fourth filter, a fifth filter, and a sixth filter, wherein the fourth mixer is in quadrature with the first mixer, the fifth mixer is in quadrature with the second mixer, and the sixth mixer is in quadrature with the third mixer.

20. The capacitive sensor device of claim 17, wherein the processing system is further configured to perform demodulation via a fourth mixer and a fourth filter, wherein the fourth mixer is in quadrature with the first mixer, and wherein interference associated with the first transmitter signal corresponds to the output of the fourth mixer and the third filter.

* * * * *